US009671085B2

(12) United States Patent
Brunt, Jr. et al.

(10) Patent No.: US 9,671,085 B2
(45) Date of Patent: Jun. 6, 2017

(54) REFLECTOR FOR AN LED LIGHT SOURCE

(71) Applicant: Dow Corning Corporation, Midland, MI (US)

(72) Inventors: Harold W. Brunt, Jr., Grand Rapids, MI (US); Emil Radkov, Midland, MI (US); Wei Rong, Midland, MI (US); Jacob William Steinbrecher, Midland, MI (US); Michael Raymond Strong, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 184 days.

(21) Appl. No.: 14/625,836

(22) Filed: Feb. 19, 2015

(65) Prior Publication Data

US 2015/0300598 A1  Oct. 22, 2015

Related U.S. Application Data

(60) Provisional application No. 61/982,686, filed on Apr. 22, 2014.

(51) Int. Cl.
*F21V 7/10* (2006.01)
*B29C 39/00* (2006.01)
(Continued)

(52) U.S. Cl.
CPC ............ *F21V 7/10* (2013.01); *B29C 39/00* (2013.01); *B29C 39/006* (2013.01);
(Continued)

(58) Field of Classification Search
CPC ..... B29C 39/006; B29C 39/00; B29C 67/246; F21V 7/10; F21L 4/005
See application file for complete search history.

(56) References Cited

U.S. PATENT DOCUMENTS 3,419,593 A    12/1968  Willing
3,893,754 A *  7/1975  McInally .............. G02B 5/10
                                              359/858

(Continued)

FOREIGN PATENT DOCUMENTS

CN    101735619 A    6/2010
JP    2010-263165 A  11/2010
(Continued)

OTHER PUBLICATIONS

U.S. Appl. No. 61/746,262, filed Dec. 27, 2012, 33 pages.
(Continued)

*Primary Examiner* — David V Bruce
(74) *Attorney, Agent, or Firm* — Howard & Howard Attorneys PLLC

(57) ABSTRACT

A reflector for reflecting light emitted by an LED light source and a method of forming the same are provided. The reflector has a unitary silicone body having a first end and a second end opposite the first end. The unitary silicone body has an inner surface extending between the first and second ends. The inner surface defines a first aperture at the first end for receiving the LED light source. The inner surface defines a second aperture at the second end for permitting light emitted from the LED light source to escape the unitary silicone body. The inner surface has a maximum inner diameter between the first and second ends. The inner surface has an inner diameter at the second end that is less than the maximum inner diameter.

21 Claims, 9 Drawing Sheets

(51) Int. Cl.
*B29C 67/24* (2006.01)
*F21L 4/00* (2006.01)
*B29K 83/00* (2006.01)
*B29L 11/00* (2006.01)
*F21Y 101/00* (2016.01)
*F21Y 115/10* (2016.01)

(52) U.S. Cl.
CPC ............ *B29C 67/246* (2013.01); *F21L 4/005* (2013.01); *B29K 2083/00* (2013.01); *B29K 2083/005* (2013.01); *B29L 2011/0083* (2013.01); *F21Y 2101/00* (2013.01); *F21Y 2115/10* (2016.08)

(56) References Cited

U.S. PATENT DOCUMENTS

| | | | |
|---|---|---|---|
| 4,087,585 | A | 5/1978 | Schulz |
| 4,766,176 | A | 8/1988 | Lee et al. |
| 5,017,654 | A | 5/1991 | Togashi et al. |
| 5,194,649 | A | 3/1993 | Okawa |
| 5,444,606 | A * | 8/1995 | Barnes ............... F21V 5/02 362/309 |
| 5,466,512 | A | 11/1995 | Babcock et al. |
| 6,124,407 | A | 9/2000 | Lee et al. |
| 6,550,938 | B2 | 4/2003 | Barnes, II et al. |
| 7,595,113 | B2 | 9/2009 | Miyoshi |
| 7,710,663 | B2 | 5/2010 | Barnes et al. |
| 7,939,591 | B2 | 5/2011 | Tomoda |
| 8,012,381 | B2 | 9/2011 | Taguchi et al. |
| 8,013,056 | B2 | 9/2011 | Taguchi et al. |
| 8,022,137 | B2 | 9/2011 | Taguchi et al. |
| 8,071,697 | B2 | 12/2011 | Frisch et al. |
| 8,075,162 | B2 | 12/2011 | Falicoff et al. |
| 8,138,276 | B2 | 3/2012 | Chao et al. |
| 8,147,081 | B2 * | 4/2012 | Mrakovich ............ F21S 8/032 362/217.06 |
| 8,710,539 | B2 | 4/2014 | Matsui et al. |
| 8,733,966 | B2 | 5/2014 | Maglica et al. |
| 2007/0208128 | A1 | 9/2007 | Jung et al. |
| 2007/0218293 | A1 | 9/2007 | Kawato et al. |
| 2008/0173889 | A1 | 7/2008 | Shylo et al. |
| 2009/0258216 | A1 | 10/2009 | Yamakawa et al. |
| 2009/0321770 | A1 | 12/2009 | Ajiki et al. |
| 2010/0065880 | A1 | 3/2010 | Kashiwagi et al. |
| 2012/0025240 | A1 | 2/2012 | Lin |
| 2012/0138997 | A1 | 6/2012 | Tasaki et al. |
| 2013/0011617 | A1 | 1/2013 | Tasaki et al. |
| 2013/0099263 | A1 | 4/2013 | Heacock et al. |
| 2013/0279174 | A1 | 10/2013 | Cai et al. |
| 2014/0036497 | A1 | 2/2014 | Hussell et al. |

FOREIGN PATENT DOCUMENTS

| | | |
|---|---|---|
| JP | 2011-052115 A | 3/2011 |
| JP | 2011-054902 A | 3/2011 |
| JP | 2011-140550 A | 7/2011 |
| JP | 2012-037829 A | 2/2012 |
| KR | 20100030959 A | 3/2010 |
| KR | 20120137445 A | 12/2012 |
| WO | WO 2011/118109 A1 | 9/2011 |
| WO | WO 2012/078617 A1 | 6/2012 |
| WO | WO 2013/186977 A1 | 12/2013 |

OTHER PUBLICATIONS

English language abstract and machine-assisted English translation for CN 101735619 extracted from espacenet.com database on Feb. 12, 2015, 19 pages.

English language abstract and machine-assisted English translation for JP 2010-263165 extracted from the PAJ database on Feb. 12, 2015, 25 pages.

English language abstract and machine-assisted English translation for JP 2011-052115 extracted from the PAJ database on Feb. 12, 2015, 26 pages.

English language abstract and machine-assisted English translation for JP 2011-054902 extracted from the PAJ database on Feb. 12, 2015, 26 pages.

English language abstract and machine-assisted English translation for JP 2011-140550 extracted from the PAJ database on Feb. 12, 2015, 24 pages.

English language abstract for JP 2012-037829 extracted from the PAJ database on Feb. 12, 2015, 1 page.

English language abstract for KR 20100030959 extracted from espacenet.com database on Feb. 12, 2015, 1 page.

English language abstract not found for KR 20120137445; however, see English language equivalent U.S. Pat. No. 8,733,966. Original document extracted from espacenet.com database on Feb. 12, 2015, 19 pages.

English language abstract for WO 2011/118109 extracted from espacenet.com database on Feb. 12, 2015, 2 pages.

English language abstract for WO 2013/186977 extracted from espacenet.com database on Feb. 12, 2015, 2 pages.

* cited by examiner

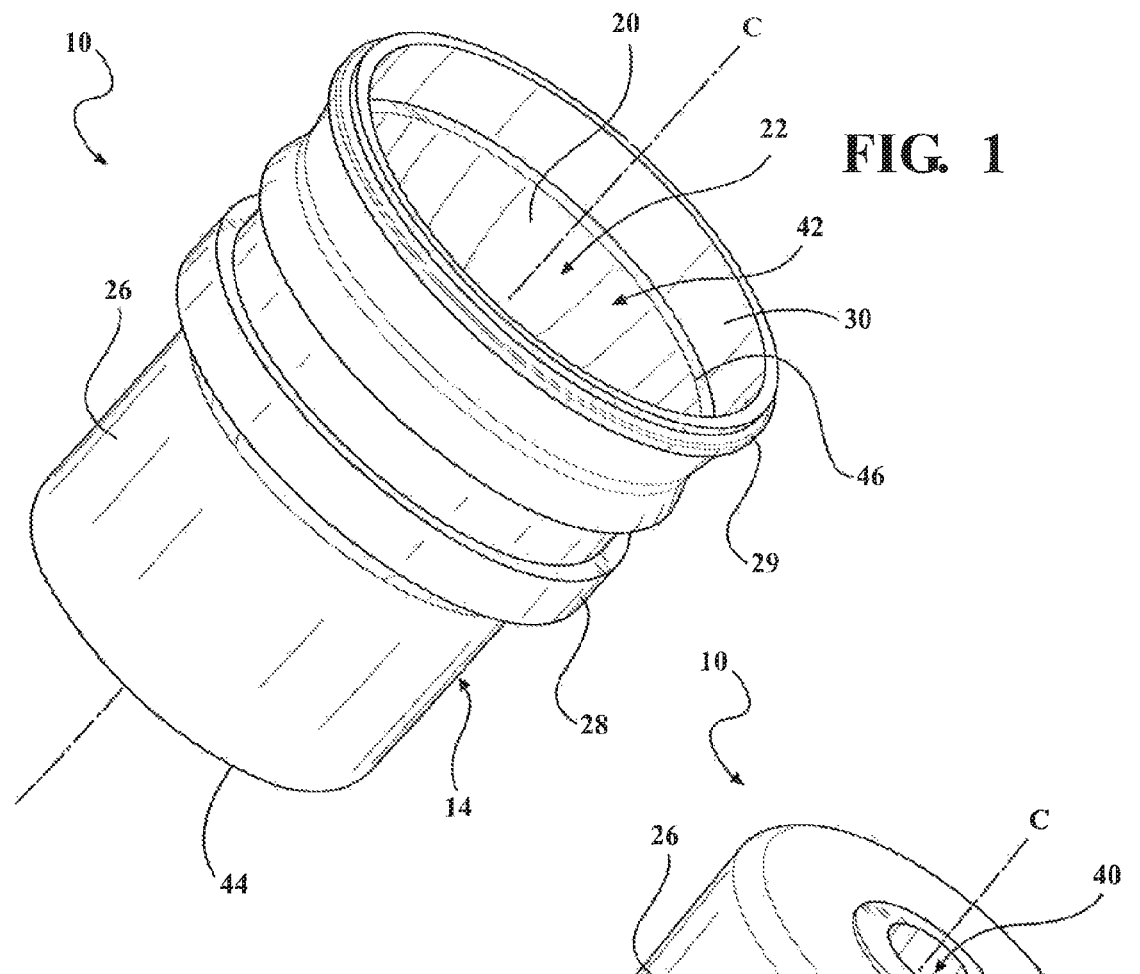
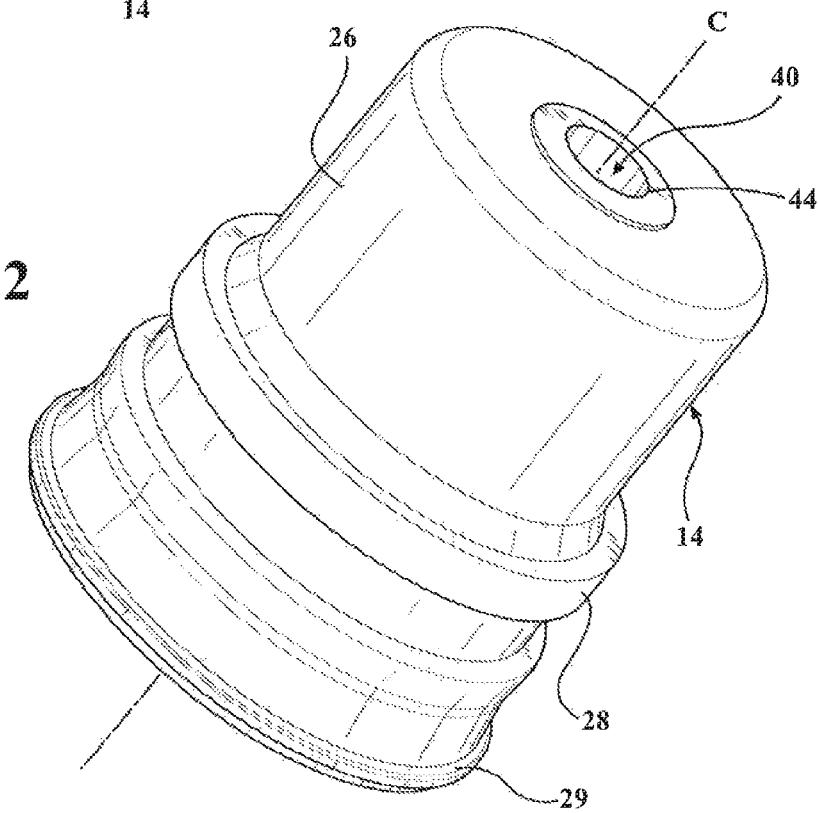

REFLECTOR FOR AN LED LIGHT SOURCE

RELATED APPLICATIONS

This application claims priority to U.S. Provisional Patent Application No. 61/982,686 filed on Apr. 22, 2014, the contents of which are hereby incorporated by reference in their entirety.

FIELD OF THE INVENTION

The present invention generally relates to a reflector for an LED light source.

BACKGROUND OF THE INVENTION

It is desirable for a light source, such as an LED (light emitting diode) light source, to illuminate an area uniformly and with even power distribution. Uniformity and power distribution of the illuminated area are measured across a viewing axis, or axial center, of the illuminated area. Uniformity exists where the illuminated area exhibits spectral continuity, or minimal to no color separation, over the viewing axis. Color separation occurs when the color temperature varies in the illuminated area, resulting in variations in color over the viewing axis. Even power distribution is present where the illuminated area has a consistent distribution of optical energy over the viewing axis, resulting in consistent brightness in the illuminated area.

Conventionally, the LED light source is placed in a reflector such that the reflector distributes the light emitted by the LED light source. However, achieving spectral continuity and even power distribution over the viewing axis with a reflector is no easy task. Conventional reflectors attempting to achieve spectral continuity and even power distribution have many shortcomings. In some conventional reflectors, the reflected light follows unequal optical path lengths, thereby causing noticeable color separation over the viewing axis. Other conventional reflectors, such as those having a metalized surface or total internal reflection (TIR) optics, create an illuminated area with an uneven distribution of power. Such conventional reflectors create the illuminated area with a bright center and a relatively dimmer outer region, or vice-versa. The uneven distribution of power in such conventional reflectors further worsens the color separation. Furthermore, other conventional reflectors require additional features and parts, such as highly textured surfaces, polished surfaces, coated surfaces, and/or complex optics, such as filters and diffusing lenses/films. Such additional features and parts incur additional cost and nevertheless cause a significant loss of optical energy at the illuminated surface.

As such, there remains an opportunity to provide a reflector that overcomes the aforementioned obstacles.

SUMMARY OF THE INVENTION AND ADVANTAGES

The invention provides a reflector for reflecting light emitted by an LED light source. The reflector has a unitary silicone body having a first end and a second end opposite the first end. The unitary silicone body has an inner surface extending between the first and second ends. The inner surface defines a first aperture at the first end for receiving the LED light source. The inner surface defines a second aperture at the second end for permitting light emitted from the LED light source to escape the unitary silicone body. The inner surface has a maximum inner diameter between the first and second ends. The inner surface has an inner diameter at the second end that is less than the maximum inner diameter.

The invention provides a method of forming the reflector. The method includes disposing a curable silicone composition into a mold. The method includes curing the curable silicone composition in the mold to form the reflector comprising the unitary silicone body.

The reflector favorably achieves spectral continuity and even power distribution. The configuration of the inner surface allows light emitted by the LED light source to follow equal optical path lengths. As such, the illuminated area projected by the LED light source and the reflector exhibits little to no color separation over a viewing axis. The reflector further provides an illuminated area that is uniformly bright over the viewing axis.

The reflector and method minimize cost because the reflector includes the unitary silicone body. As such, the reflector eliminates the need for complex optics, such as filters and diffusing lenses and films. This greatly simplifies manufacture of the reflector and significantly maximizes production of optical energy at the illuminated area.

Moreover, the unitary silicone body exhibits excellent elongation and reflectance properties. The unitary silicone body advantageously improves spectral continuity and power distribution. As such, the reflector further eliminates the need for additional textured, polished, and/or coated surfaces in an attempt to achieve spectral continuity and even power distribution.

BRIEF DESCRIPTION OF THE DRAWINGS

Other aspects of the present invention may be understood by reference to the following detailed description and the accompanying drawings wherein:

FIG. 1 is a top perspective view of a reflector according to one embodiment;

FIG. 2 is a bottom perspective view of the reflector of FIG. 1;

DETAILED DESCRIPTION OF THE INVENTION

Referring to the Figures, wherein like numerals indicate like or corresponding parts throughout the several views, a reflector is shown throughout the Figures at 10.

The reflector 10 is configured to reflect light emitted by an LED light source 12. The LED light source 12 when powered, emits light into the reflector 10. In turn, the LED light source 12 and the reflector 10 generate an illuminated area.

The LED light source 12 may have various configurations. In one embodiment, the LED light source 12 includes a single LED. Alternatively, the LED light source 12 includes a plurality, or an array, of LEDs. The LED light source 12 may emit light of any suitable wavelength and predetermined color, including but not limited to, red, green, blue, and white. The LED light source 12 may have various other configurations without departing from the scope of the invention.

Figure 3:
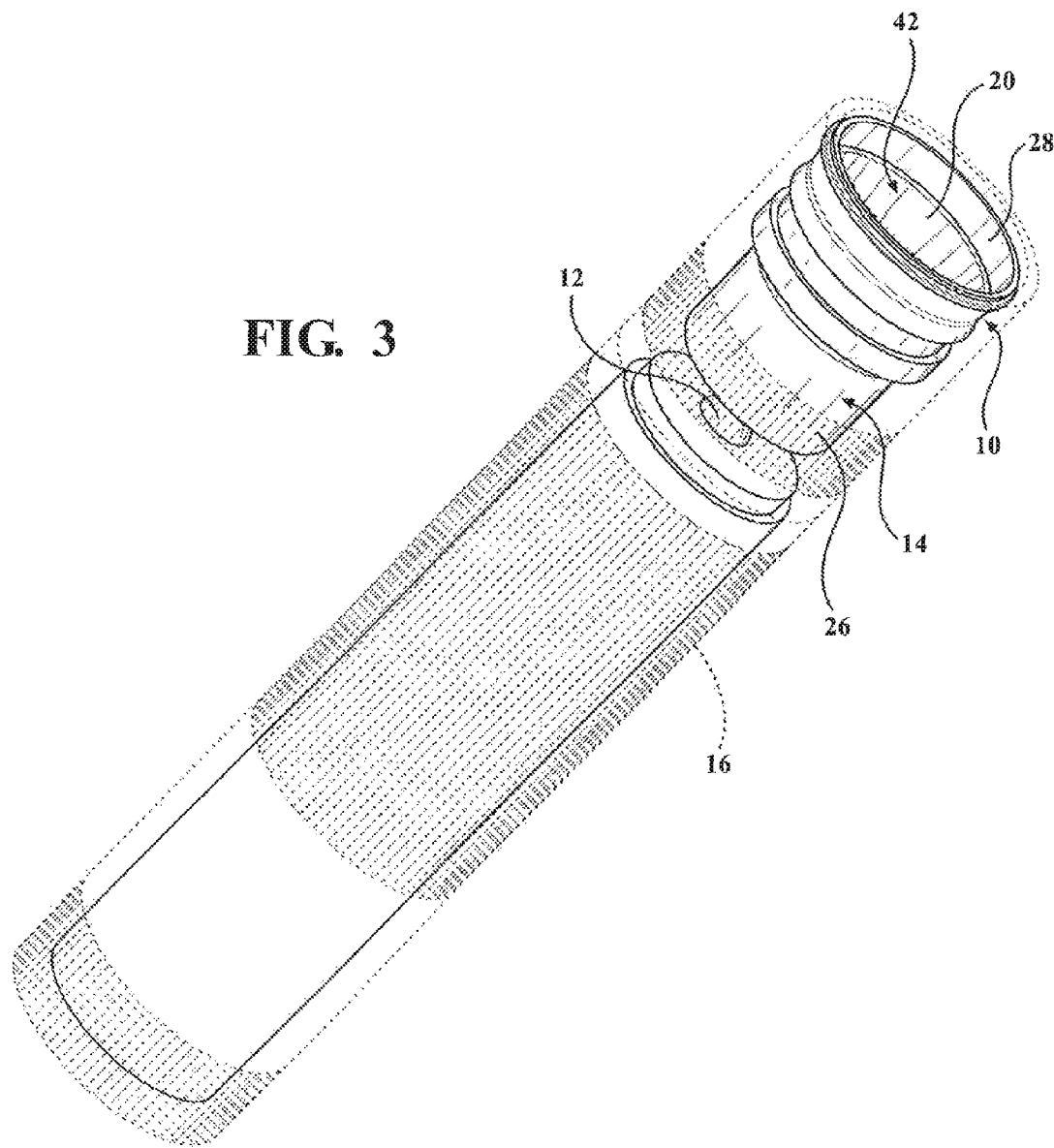
FIG. 3 is a top perspective view of the reflector of FIG. 1 in use.
Figure 4:
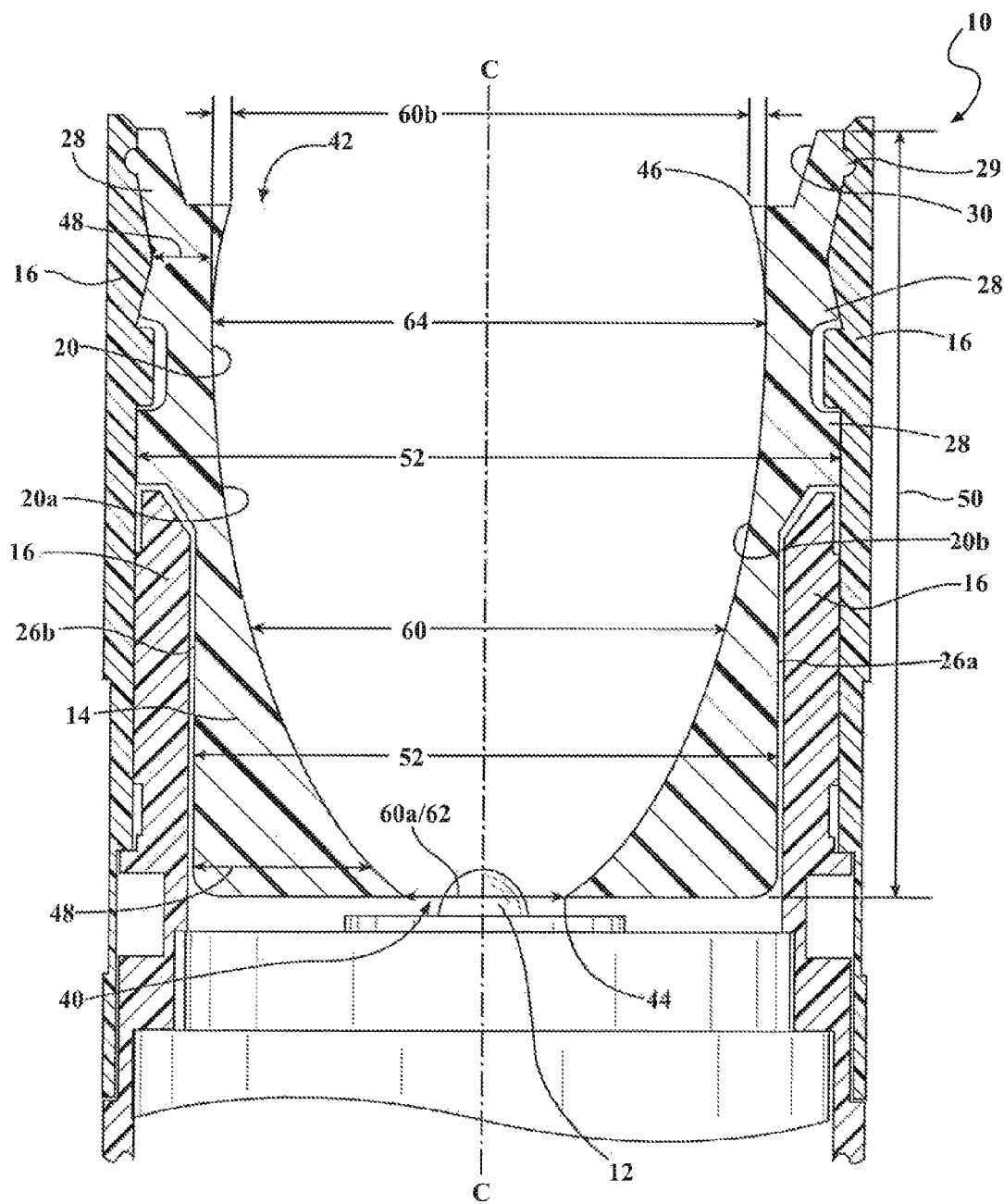
FIG. 4 is a cross-sectional view of the reflector of FIG. 1 in use.

As shown throughout the Figures, the reflector 10 includes a unitary silicone body 14. In FIGS. 3 and 4, the unitary silicone body 14 is configured to be disposed adjacent the LED light source 12. In some embodiments, as shown in FIGS. 3 and 4, the unitary silicone body 14 is configured to be utilized with a lighting apparatus 16, including, but not limited to, a flashlight or a lamp. The lighting apparatus 20 includes the LED light source 12 and the reflector 10. The LED light source 12 is disposed in the reflector 10 in such a way that the lighting apparatus 20 is configured to reflect light emitted by the LED light source 12. In such instances, the LED light source 12 of the lighting apparatus 20 is powered such that the LED light source 12 emits light that is reflected by the reflector 10 with spectral continuity and even power distribution.

25. A method of reflecting light emitted by an LED light source, said method comprising powering the LED light source of the lighting apparatus of claim 24 such that the LED light source emits light that is reflected by the reflector with spectral continuity and even power distribution The unitary silicone body 14 has an inner surface 20. The inner surface 20 is configured to reflect light emitted by the LED light source 12. The inner surface 20 may include an interior surface area of the unitary silicone body 14. In another embodiment, the inner surface 20 may include a surface that is situated within the unitary silicone body 14. In yet another embodiment, the inner surface 20 may include a surface defining a cavity 22 within the unitary silicone body 14.

The unitary silicone body 14 has an outer surface 26. The outer surface 26 is disposed generally opposite the inner surface 20. In one embodiment, the outer surface 26 includes an exterior surface area of the unitary silicone body 14. In another embodiment, the outer surface 26 includes an exterior perimeter of the unitary silicone body 14.

In instances where the unitary silicone body 14 is utilized with the lighting apparatus 16, as shown in FIGS. 3 and 4, the unitary silicone body 14 may interface with the lighting apparatus 16. Typically, the outer surface 26 of the unitary silicone body 14 interfaces with the lighting apparatus 16, as shown in FIG. 4. However, the inner surface 20 may interface with the lighting apparatus 16 in some instances. The unitary silicone body 14 may interface with any suitable portion of the lighting apparatus 16. In one embodiment, the unitary silicone body 14 interfaces with a groove defined by the lighting apparatus 16.

The unitary silicone body 14 may include various features for retaining the unitary silicone body 14 to the lighting apparatus 16. In one example, as shown in FIGS. 1-4, the unitary silicone body 14 includes a retaining feature 28. The retaining feature 28 may be defined by the outer surface 26. The retaining feature 28 may have an annular configuration for allowing the unitary silicone body 14 to interface with the lighting apparatus 16 on all sides. In such instances, the retaining feature 28 may include a retaining ring 29. The retaining feature 28 may further provide a lip 30 that is annularly formed. As will be described below, the lip 30 may extend beyond an end 46 of the inner surface 20, as shown in FIG. 4. The lip 30 may include the retaining ring 29. In such instances, the lip 30 may provide additional height to the unitary silicone body 14 for allowing the retaining ring 29 to locate properly in the groove of the lighting apparatus 16 (as shown in FIG. 4). The retaining feature 28 may be integrally part of the unitary silicone body 14 or a separate component attached to the unitary silicone body 14. The unitary silicone body 14 may include more than one retaining feature 28. The retaining feature 28 may be defined as an undercut or an overmold. In one embodiment, the retaining feature 28 is not considered to be a reflective component of the reflector 10. The retaining feature 28 may have various other configurations without departing from the scope of the invention.

The unitary silicone body 14 may be formed of a curable silicone composition. In such instances, the unitary silicone body 14 formed of the curable silicone composition is distinguished from a unitary silicone body 14 not formed of the curable silicone composition, but merely having a coating or film of a curable silicone composition. Both the formed and not formed aspects of the unitary silicone body 14 are contemplated.

One example of the curable silicone composition is described in U.S. provisional patent application Ser. No. 61/746,262 to the Applicants, portions of which are repeated herein, and the entirety of which is expressly incorporated herein by reference. For example, the curable silicone composition may be a hydrosilylation-curable silicone composition. In one embodiment, the hydrosilylation-curable silicone composition may comprise (A) a silicone resin, (B) an organosilicon compound, (C) a hydrosilylation catalyst, and (D) a flame retardant component comprising aluminum hydroxide. In other embodiments, the hydrosilylation-curable silicone composition may further comprise (E) a reflective component different from component (D) and comprising titanium dioxide.

In yet another embodiment, the curable silicone composition comprises (A) a silicone resin comprising $R1SiO_{3/2}$ units and/or $SiO_{4/2}$ units in combination with $R13SiO_{1/2}$ units and/or $R12SiO_{2/2}$ units, wherein R1 is independently a substituted or unsubstituted C1 to C10 hydrocarbyl group free of aliphatic unsaturation, an alkenyl group, or a hydrogen atom, with the proviso that the silicone resin (A) includes at least two silicon-bonded alkenyl groups or at least two silicon-bonded hydrogen atoms per molecule, (B) an organosilicon compound having an average of at least two silicon-bonded hydrogen atoms or at least two silicon-bonded alkenyl groups per molecule, with the proviso that when the silicone resin (A) includes silicon-bonded alkenyl groups, the organosilicon compound (B) includes at least two silicon-bonded hydrogen atoms per molecule, and when the silicone resin (A) includes silicon-bonded hydrogen atoms, the organosilicon compound (B) includes at least two silicon-bonded alkenyl groups per molecule, (C) a hydrosilylation catalyst, (D) a flame retardant component comprising aluminum hydroxide in an amount to provide at least 15 parts by weight of the aluminum hydroxide in the composition based on 100 parts by weight of the composition, and (E) a reflective component different from component (D) and comprising titanium dioxide in an amount to provide no more than 15 parts by weight of the titanium dioxide in the composition based on 100 parts by weight of the composition.

The reflector 10 may be formed according to any suitable manufacturing method. According to one method, embodiment, the reflector 10 is formed by disposing the curable silicone composition into a mold and curing the curable silicone composition in the mold to form the unitary silicone body 14. For example, the unitary silicone body 14 may be formed by at least one of injection molding, transfer molding, casting, extruding, overmolding, compression molding, or cavity molding the curable silicone composition, or any combination thereof. In such instances, the unitary silicone body 14 may be a molded article. The curable silicone composition may be cured in the mold via the application of heat. Heat may be applied directly or indirectly to the curable silicone composition. The unitary silicone body 14 may be integrally formed. In other words, the inner surface 20 and the outer surface 26 of the unitary silicone body 14 are formed by the same curable silicone composition and at the same time, i.e., in one-step. The physical and compositional properties of the curable silicone composition allow the unitary silicone body 14 to be integrally formed.

In one embodiment, the unitary silicone body 14, and more specifically, the inner surface 20, may be diffuse. In such instances, the inner surface 20 is configured to reflect light emitted by the LED light source 12 in such a way that the emitted light is reflected at various angles for any given location on the inner surface 20. By being diffuse, the unitary silicone body 14 is distinguished from a body that is "spectral" such that the emitted light is reflected only at a single angle for any given location on the inner surface 20. The physical and compositional properties of the curable silicone composition allow the inner surface 20 to be diffuse. For example, the curable silicone composition may be a clear polymer with filler particles carried evenly throughout. The filler particles have surfaces that are irregular in shape and are not oriented in any plane. The light reflection occurs off the surfaces of the filler particles. Given the surfaces of the filler particles, the light goes through the clear polymer and strikes the surfaces of the filler particles at varying angles. Thus, the light reflected is scattered or diffuse. The inner surface 20 may exhibit various diffusion properties. In one example, the inner surface 20 exhibits complete diffusion such that the emitted light is reflected at various angles for every given location on the inner surface 20. In other words, no part of the inner surface 20 is spectral. In another example, the inner surface 20 may be substantially diffuse such that the emitted light is reflected at various angles at substantially all locations on the inner surface 20. In yet another embodiment, the inner surface 20 has a diffuse reflection within the range of 90% to 99% reflectivity.

The unitary silicone body 14, and more specifically, the inner surface 20, may be matte. In other words, the inner surface 20 may have a matte finish. Said differently, the inner surface 20 may have a dull finish. In such instances, the inner surface 20 generally does not exhibit a mirror-like, or glossy, finish. The physical and compositional properties of the curable silicone composition allow the inner surface 20 to be matte. Additionally, the physical properties of the mold allow the inner surface 20 to be matte. In one embodiment, the curable silicone composition reproduces a surface of a mold. Thus, the surface of the mold forms the inner surface 20 of the reflector 10. In one example, the surface of the mold is bead blasted with 3 mil glass beads such that the surface comprises a plurality of dents. Once placed in the mold, the curable silicone composition flows into the dents thereby reproducing the surface of the mold. The rheological properties, e.g., viscosity, of the curable silicone composition allow the curable silicone composition to flow into and fully fill the dents before the curable silicone composition cures. The curable silicone composition further exhibits a predetermined amount of cohesive strength allowing the cured silicone composition (molded article) to be extracted from the mold without tearing off the features of the cured silicone composition that are molded by the dents. In one embodiment, the inner surface 20 has a matte finish created by glass bead blast within the range of 2 mil to Emil bead size. The inner surface 20 may exhibit any suitable variation of dullness and may be created by various other methods.

The unitary silicone body 14, and more specifically, the inner surface 20, may be white. In other words, the inner surface 20 may have a white finish. The physical and compositional properties of the curable silicone composition allow the inner surface 20 to be white. For example, titanium dioxide and fillers in the curable silicone composition may allow the inner surface 20 to be white. The inner surface 20 may be varying degrees white. In one embodiment, the inner surface 20 is purely white such that inner surface 20 reflects all wavelengths of visible light, without absorption. Alternatively, the inner surface 20 may be substantially white such that the inner surface 20 reflects nearly all wavelengths of visible light. In one embodiment, the inner surface 20 has a white finish with Hunter 1948 L* values within the range of 98.0 to 99.9.

The unitary silicone body 14, and more specifically, the inner surface 20, may be smooth. In other words, the inner surface 20 may have a smooth finish. By being smooth, the inner surface has a texture that is substantially frictionless. The smooth finish is distinguished from a rough finish having a texture that exhibits substantial friction. As described above, the physical and compositional properties of the curable silicone composition allow the inner surface 20 to be smooth. Additionally, the physical properties of the mold allow the inner surface 20 to be smooth. When smooth, the inner surface 20 may exhibit a low static dry coefficient of friction. In one example, the static dry coefficient of friction is greater than zero and less than 0.5. In another example, the static dry coefficient of friction is greater than zero and less than 0.2. In another embodiment, the inner surface 20 has a smooth finish within the range of SPI (Society of the Plastics Industry) finishes A-1 to A-3.

The unitary silicone body 14, and more specifically, the inner surface 20, may be opaque. The inner surface 20 may have varying degrees of opacity. In one example, the inner surface 20 is purely opaque such that inner surface 20 is completely impenetrable by light. In such instances, the inner surface 20 is neither transparent nor translucent. In another example, the inner surface 20 is substantially opaque such that inner surface 20 is substantially impenetrable by light. Said differently, the inner surface 20 may be partially translucent. The physical and compositional properties of the curable silicone composition allow the inner surface 20 to be opaque.

As shown throughout the Figures, the unitary silicone body 14 defines a first aperture 40 and a second aperture 42. The first aperture 40 is configured to receive the LED light source 12. The second aperture 42 is configured for permitting light from the LED light source 12 to escape the unitary silicone body 14. In one embodiment, the inner surface 20 defines the first and second apertures 40, 42.

As best shown in FIGS. 4-8, the unitary silicone body 14 has a first end 44 and a second end 46 opposite the first end 44. The inner surface 20 extends between the first and second ends 44, 46. The first aperture 40 is defined at the first end 44. The second aperture 42 is defined at the second end 46. Therefore, the first and second apertures 40, 42 are defined at opposite ends 44, 46 of the inner surface 20. In instances where the unitary silicone body 14 includes the lip 30 of the retaining feature 28, as shown in FIG. 4, the lip 30 is generally not considered to be part of the inner surface 20. Thus, in FIG. 4, the second end 46 of the inner surface 20 is not defined by the lip 30 of the retaining feature 28.

As shown in FIGS. 1-2, and 4-8, a central axis C is defined through the unitary silicone body 14. The central axis C generally passes between the inner surface 20 of the unitary silicone body 14 and through the first and second apertures 40, 42. When viewed in cross-section, as shown in FIG. 4, the inner surface 20 has opposing sides 20a, 20b that are disposed on opposite sides of the central axis C.

As shown in FIG. 4, the inner surface 20 may be defined annularly about the central axis C. In other words, for any given cross-sectional plane of the unitary silicone body 14 taken transverse to the central axis C, each opposing side 20, 20b of the inner surface 20 is spaced equidistant from the central axis C.

The outer surface 26 may be defined annularly about the central axis C. When viewed in cross-section, as shown in FIG. 4, the outer surface 26 has opposing sides 26a, 26b that are disposed on opposite sides of the central axis C. In other words, for any given cross-sectional plane of the unitary silicone body 14 taken transverse to the central axis C, each opposing side 26a, 26b of the outer surface 26 is spaced equidistant from the central axis C.

Both the inner and outer surfaces 20, 26 may be defined annularly about the central axis C. Alternatively, one of the inner and outer surfaces 20, 26 may be defined annularly about the central axis C. Moreover, at least one, or both, of the inner and outer surfaces 20, 26 may be defined asymmetrically about the central axis C. In such instances, for any given cross-sectional plane of the unitary silicone body 14 taken transverse to the central axis C, the opposing sides 20a, 20b of the inner surface 20 and/or the opposing sides 26a, 26b of outer surface 26 are spaced at different distances from the central axis C.

The first and second apertures 40, 42 may have various geometrical configurations. In one embodiment, as best shown in FIGS. 1 and 2, the first aperture 40 and/or second aperture 42 are circular. In other words, the first aperture 40 and/or second aperture 42 are formed annularly about the central axis C. In such instances, the central axis C passes through a geometrical center of the first and/or second apertures 40, 42. Alternatively, the first aperture 40 and/or second aperture 42 may have other configurations, including, but not limited to, an elliptical configuration, and the like.

In one embodiment, as shown in FIGS. 4-8, the first and second apertures 40, 42 are each defined in a plane that is perpendicular to the central axis C. Alternatively, the first and/or second aperture 40, 42 may be defined in a plane that is non-perpendicular with respect to the central axis C. In such instances, the planes in which the first and/or second aperture 40, 42 are defined may be tilted according to predetermined angle with respect to the central axis C. Additionally, the first and/or second aperture 40, 42 may be defined partially in a plane that is perpendicular to the central axis C and partially a plane that is not perpendicular to the central axis C.

As shown in FIG. 4, the unitary silicone body 14 has a thickness 48 between the inner surface 20 and the outer surface 26. The unitary silicone body 14 may have any suitable thickness 48. In one embodiment, the thickness 48 is in a range between 1-10 mm. In another embodiment, the thickness 48 is in a range between 1-5 mm. As shown in FIG. 4, the thickness 48 may vary along the central axis C. For example, as shown in FIG. 4, the thickness 48 may be greater near the first end 44 than near the second end 46. Alternatively, the thickness 48 may be uniform along the central axis C. In instances where the unitary silicone body 14 includes the retaining feature 28, as shown in FIG. 4, the thickness 48 of the unitary silicone body 14 may include a thickness of the retaining feature 28. Alternatively, the thickness 48 of the unitary silicone body 14 may exclude the thickness of the retaining feature 28. The unitary silicone body 14 may have other thickness dimensions without departing from the scope of the invention.

Figure 5:
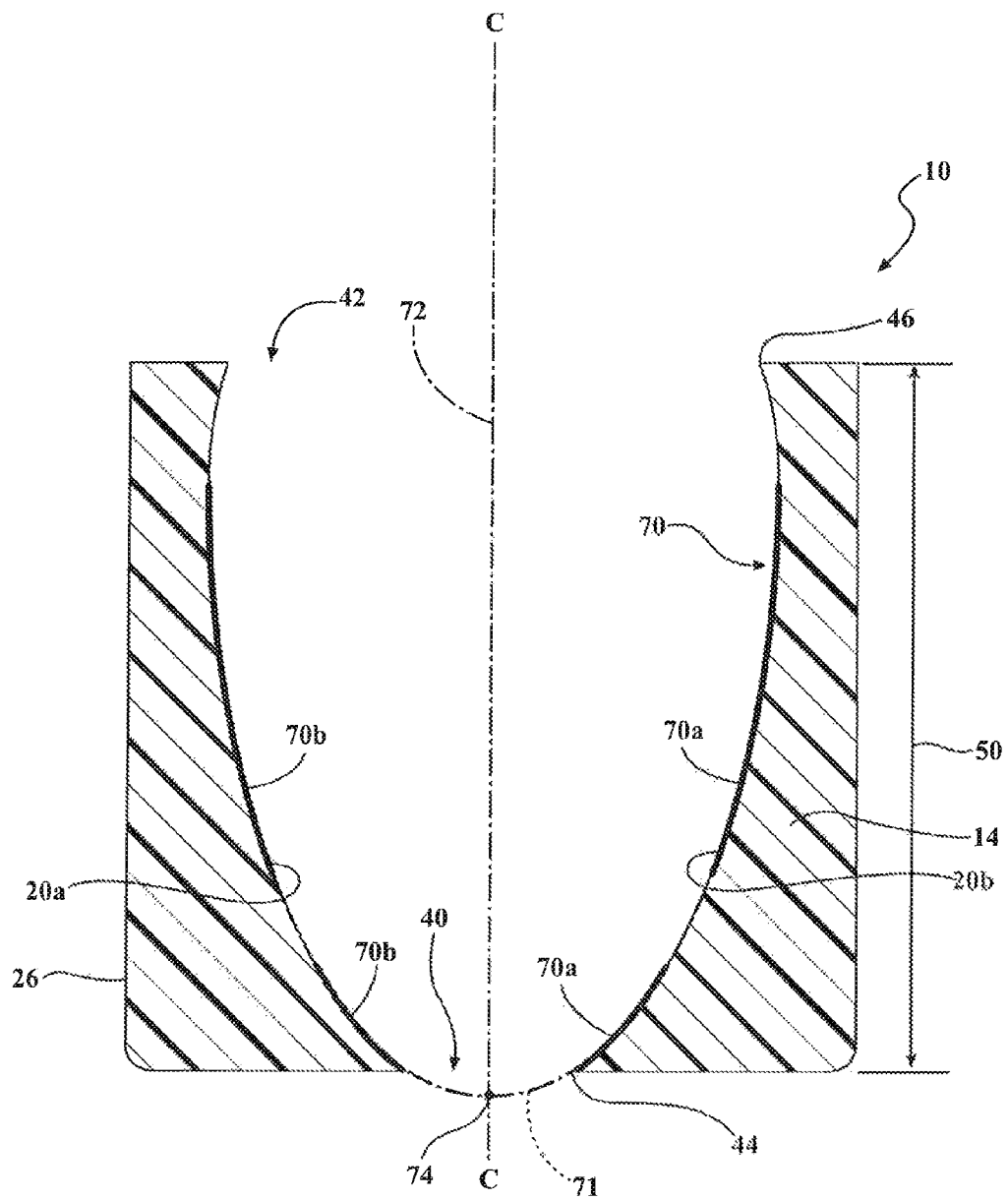
FIG. 5 is a cross-sectional view of the reflector according to another embodiment.

The unitary silicone body 14 may have any suitable exterior dimensions. The exterior dimensions generally correspond to dimensions defined with respect to the outer surface 26 of the unitary silicone body 14. In FIG. 5, the unitary silicone body 14 has a height 50 defined between the opposing first and second ends 44, 46 of the inner surface 20. In such instances, the height 50 may be defined in a range between 15-30 mm. Alternatively, in instances where the unitary silicone body 14 includes the retaining feature 28, as shown in FIG. 4, the height 50 of the unitary silicone body 14 may include a height of the retaining feature 28. For example, as shown in FIG. 5, the height is between the first end 42 and the lip 30 of the retaining feature 28. In such instances, the height 50 of the unitary silicone body 14 with the retaining feature 28 may be in a range between 20-30 mm.

As shown in FIG. 4, the unitary silicone body 14 has an outer diameter 52 defined by a length defined between opposing sides 26a, 26b of the outer surface 26 as taken along any given plane that is perpendicular to the central axis C in cross-section. The outer diameter 52 may or may not include a width of the retaining feature 28. In embodiments where the width of the retaining feature 28 is excluded, the outer diameter 52 may be in a range between 15-20 mm. Alternatively, in instances where the width of the retaining feature 28 is included, the outer diameter 52 may be in a range between 25-30 mm. However, the outer diameter 52 may have any suitable dimensions. As shown in FIG. 4, the outer diameter 52 may vary along the central axis C. In one example, the outer diameter 52 may be different for every given plane along the central axis C. Alternatively, the outer diameter 52 may be the same at two separate planes along the central axis C. The unitary silicone body 14 may have other exterior dimensions without departing from the scope of the invention.

The unitary silicone body 14 may have any suitable interior dimensions. The interior dimensions generally correspond to dimensions defined with respect to the inner surface 20 of the unitary silicone body 14. For example, the inner surface 20 has an inner diameter 60, as shown in FIG. 4. The inner diameter 60 has a length defined between opposing sides 20a, 20b of the inner surface 20 as taken along any given plane that is perpendicular to the central axis C in cross-section. As is described in detail below, the inner diameter 60 of the inner surface 20 generally varies along the central axis C. The inner diameter 60 of the inner surface 20 may be different for every given plane along the central axis C. Alternatively, the inner diameter 60 of the inner surface 20 may be the same at two separate planes along the central axis C.

As shown in FIG. 4, the inner surface 20 at the first aperture 40 has an inner diameter 60a. The inner surface 20 at the second aperture 40 has an inner diameter 60b. In FIG. 4, the inner diameter 60b at the second aperture 42 is greater than the inner diameter 60a at the first aperture 40. Said differently, the second aperture 42 has a larger opening than the first aperture 40.

As shown in FIG. 4, the inner surface 20 may have a minimum inner diameter 62. The minimum inner diameter 62 is less than all other inner diameters 60 of the inner surface 20. Said differently, the inner surface 20 is narrowest at the minimum inner diameter 62. In one embodiment, the inner surface 20 has only a single minimum inner diameter 62. Alternatively, the inner surface 20 may have two or more minimum inner diameters 62. In FIG. 4, the minimum inner diameter 62 is defined at the first end 44.

As shown in FIG. 4, the inner surface 20 includes a maximum inner diameter 64. The maximum inner diameter 64 is greater than all other inner diameters 60 of the inner surface 20. Said differently, the inner surface 20 is widest at the maximum inner diameter 64. The maximum inner diameter 64 is between the first and second ends 44, 46. In other words, the inner surface 20 has the maximum inner diameter 64 somewhere between the first and second ends 44, 46. For example, in FIG. 4, the inner surface 20 has the maximum inner diameter 64 slightly below the second end 46. In other words, the opposing sides 20a, 20b of the inner surface 20 curve inward toward the central axis C as the inner surface 20 approaches the second end 42 from the portion of the inner surface 20 defining the maximum inner diameter 64. In one embodiment, the inner surface 20 has only a single maximum inner diameter 64. Alternatively, the inner surface 20 may have more than one maximum inner diameter 64.

As shown in FIG. 4, the inner diameter 60b of the inner surface 20 at the second end 46 is less than the maximum inner diameter 64 of the inner surface 20. In other words, the maximum inner diameter 64 of the inner surface 20 is greater than the inner diameter 60b of the inner surface 20 at the second end 46. As such, the inner diameter 60b of the second end 46 is not the maximum inner diameter 64. As is described in detail below, the cross-sectional configuration of the inner surface 20 along the central axis C allows for the inner diameter 60b at the second end 46 to be less than the maximum inner diameter 64.

As shown in FIGS. 5-8, the inner surface 20 may have a conic cross-section along the central axis C. The term "conic cross-section" is defined generally as any given cross-sectional plane taken through a three-dimensional cone, including, but not limited to, a parabolic cross-section, an elliptical cross-section, and/or a blend of elliptical and parabolic cross-sections, hereinafter referred to as a blended parabolic-elliptical configuration.

In one example, as shown in FIG. 5, the cross-section of the inner surface 20 has at least partially a parabolic configuration 70. In other words, the cross-section of the inner surface 20 may be at least partially parabolic. The parabolic configuration 70 has a parabola 71 having an axis of symmetry 72 that aligns with the central axis C. The parabola 71 further has a vertex 74. In FIG. 4, the vertex 74 is theoretically located on the central axis C. The parabola 71 has opposing curves 70a, 70b disposed symmetrically about the axis of symmetry 72. The curves 70a, 70b increasingly space apart from one another as the distance from the vertex 74 increases. In one embodiment, as shown in FIG. 4, both of the curves 70a, 70b of the parabola 71 correspond at least partially to both of the opposing sides 20a, 20b of the inner surface 20. Alternatively, at least one of the curves 70a, 70b of the parabola 71 may correspond at least partially to one of the opposing sides 20a, 20b of the inner surface 20. The parabola 71 may be defined according to any suitable quadratic function. Moreover, the axis of symmetry 72 and the vertex 74 of the parabola 71 may be offset from the central axis C.

For simplicity in illustration, as shown in FIG. 5, the portion of the inner surface 20 that has the parabolic configuration 70 is illustrated with a bold line defined along the inner surface 20. The inner surface 20 may have several portions that have the parabolic configuration 70. The portions of the inner surface 20 that have the parabolic configuration 70 may be continuous or connected. Alternatively, the portions of the inner surface 20 that have the parabolic configuration 70 may be separated, or spaced apart, as shown in FIG. 5.

As shown in FIG. 5, the first aperture 40 may be defined by portions of the inner surface 20 having the parabolic configuration 70. In such instances, the vertex 74 of the parabola 71 is theoretically located on the central axis C beyond the first end 44 of the unitary silicone body 14. In some instances, the second aperture 42 may be defined by portions of the inner surface 20 having the parabolic configuration 70. In such instances, the vertex 74 of the parabola 71 is theoretically located on the central axis C beyond the second end 46 of the unitary silicone body 14. The vertex 74 of the parabola 71 may be located at various other locations, such as between the first and second ends 44, 46.

Figure 6:
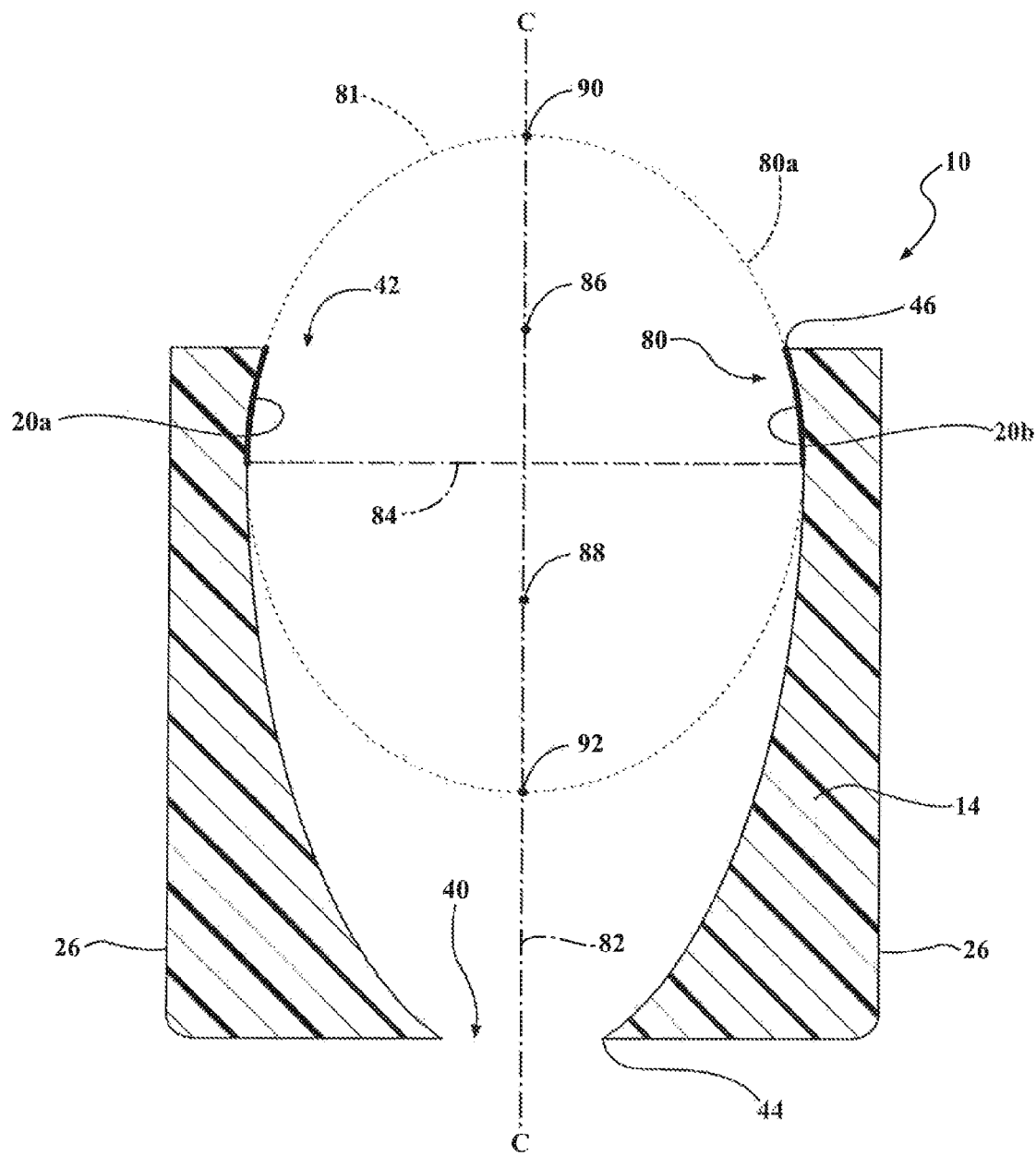
FIG. 6 is a cross-sectional view of the reflector according to another embodiment.

As shown in FIG. 6, the cross-section of the inner surface 20 may have at least partially an elliptical configuration 80. In other words, the cross-section of the inner surface 20 may be at least partially elliptical. In one embodiment, the elliptical configuration 80 has an ellipse 81 having a major axis 82 aligned with the central axis C and a minor axis 84 that is perpendicular to the major axis 82. The ellipse 81 has two focal points 86, 88 that are disposed along the major axis 82. The ellipse 81 has an elliptical perimeter that follows a curve 80a surrounding the two focal points 86, 88. A straight line drawn from one of the focal points 86, 88 to any point on the curve 80a and then back to the other focal point 86, 88 has a same length for every point on the curve 80a. The ellipse 81 further has first and second opposing vertices 90, 92 defining points at locations where the curve 80a intersects the major axis 82. The curve 80a of the ellipse 81 is disposed symmetrically about the major axis 82. In one embodiment, the curve 80a of the ellipse 81 corresponds at least partially to both of the opposing sides 20a, 20b of the inner surface 20. In another embodiment, the curve 80a of the ellipse 81 corresponds at least partially to one of the opposing sides 20a, 20b of the inner surface 20. The curve 80a may follow any suitable elliptic function. Each vertex 90, 92 of the ellipse 81 may be located at various other locations, such as between the first and second ends 44, 46. Moreover, the major axis 82 may be offset from the central axis C.

For simplicity in illustration, as shown in FIG. 6, the portion of the inner surface 20 that has the elliptical configuration 80 is illustrated with a bold line defined along the inner surface 20. The inner surface 20 may have several portions that have the elliptical configuration 80. The portions of the inner surface 20 that have the elliptical configuration 80 may be continuous or connected. Alternatively, the portions of the inner surface 20 that have the elliptical configuration 80 may be separated or spaced apart.

The first and/or second apertures 40, 42 may be defined by portions of the inner surface 20 that have the elliptical configuration 80. In such instances, as shown in FIG. 6, the first vertex 90 of the ellipse 81 is theoretically located on the central axis C beyond the first end 44 of the unitary silicone body 14. In instances where the second aperture 42 is defined by portions of the inner surface 20 that have the elliptical configuration 80, the opposing second vertex 92 of the ellipse 81 is theoretically located on the central axis C beyond the second end 46 of the unitary silicone body 14.

Figure 7:
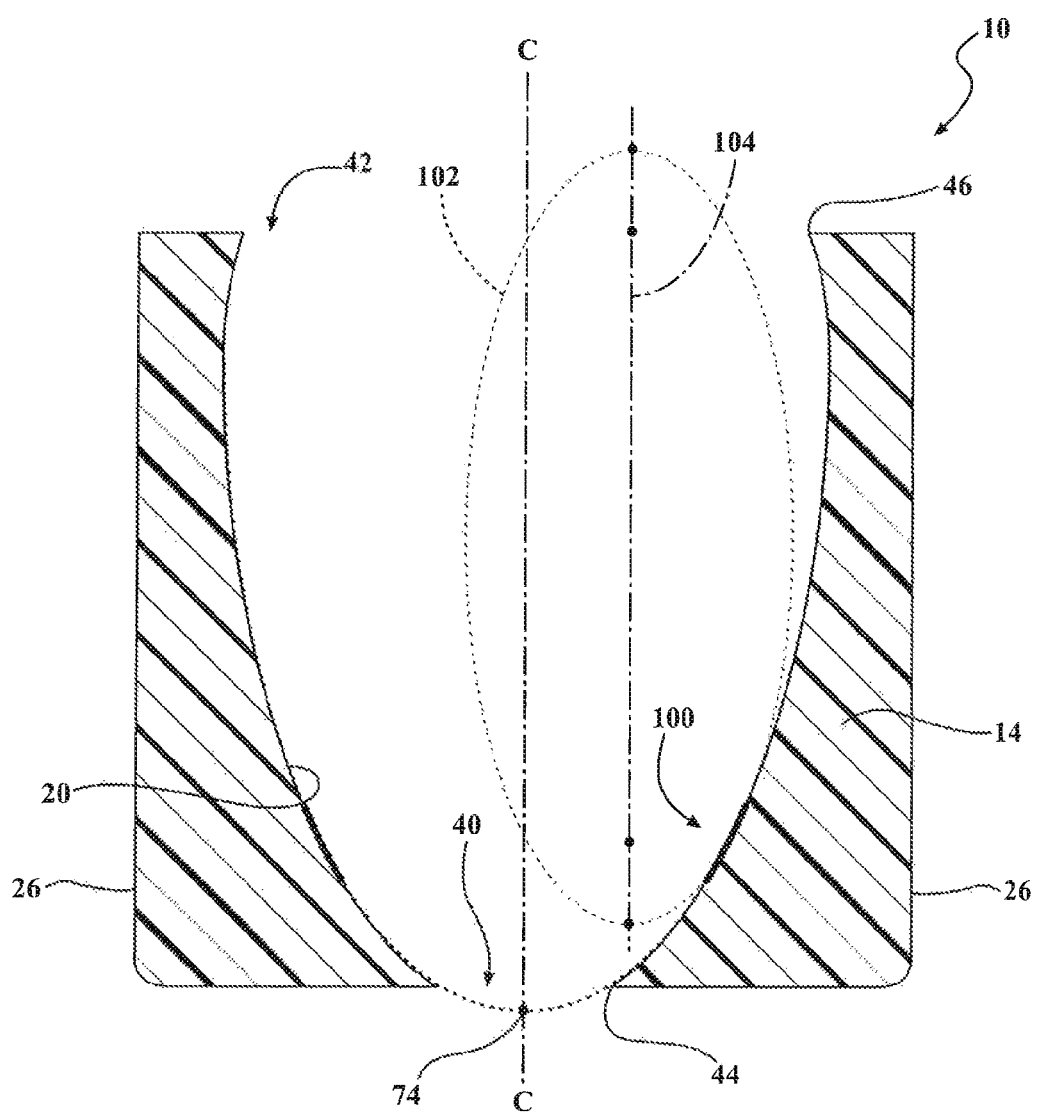
FIG. 7 is a cross-sectional view of the reflector according to another embodiment.

In yet another example, as shown in FIG. 7, the cross-section of the inner surface 20 has at least partially a blended parabolic-elliptical configuration 100. In other words, the cross-section of the inner surface 20 may be at least partially parabolic and at least partially elliptical. For simplicity in illustration, as shown in FIG. 7, the portion of the inner surface 20 that has the blended parabolic-elliptical configuration 100 is illustrated with a bold line defined along the inner surface 20. In one embodiment, the portion of the inner surface 20 that has the blended parabolic-elliptical configuration 100 may have partially the parabolic configuration 70 and partially the elliptical configuration 80. The blended parabolic-elliptical configuration 100 may include different blends of the parabolic and elliptical configurations 70, 80. In one example, the parabolic-elliptical configuration 100 is evenly blended such that the portion of the inner surface 20 is 50% part parabolic and 50% part elliptical. In another example, the parabolic-elliptical configuration 100 is unevenly blended. For example, the parabolic-elliptical configuration 100 may be 25% part parabolic and 75% part elliptical, or vice-versa. As described above with respect to the parabolic and elliptical configurations 70, 80, the first and/or second apertures 40, 42 may be defined by portions of the inner surface 20 that have the blended parabolic-elliptical configuration 100.

In one example, as shown in FIG. 7, the blended parabolic-elliptical configuration 100 has the parabola 71 having the vertex 74 aligned with the central axis C. The blended parabolic-elliptical configuration 100 further has an ellipse 102 having a major axis 104 that is off-center from the central axis C such that the major axis 104 is disposed between the central axis C and the inner surface 20. In FIG. 7, the parabola 71 and the ellipse 102, in combination, correspond at least partially to one of the opposing sides 20a, 20b of the inner surface 20. However, the parabola 71 and the ellipse 102, in combination, may correspond at least partially to both of the opposing sides 20a, 20b of the inner surface 20. The blended parabolic-elliptical configuration 100 may have various other configurations beyond that shown in FIG. 7.

Figure 8:
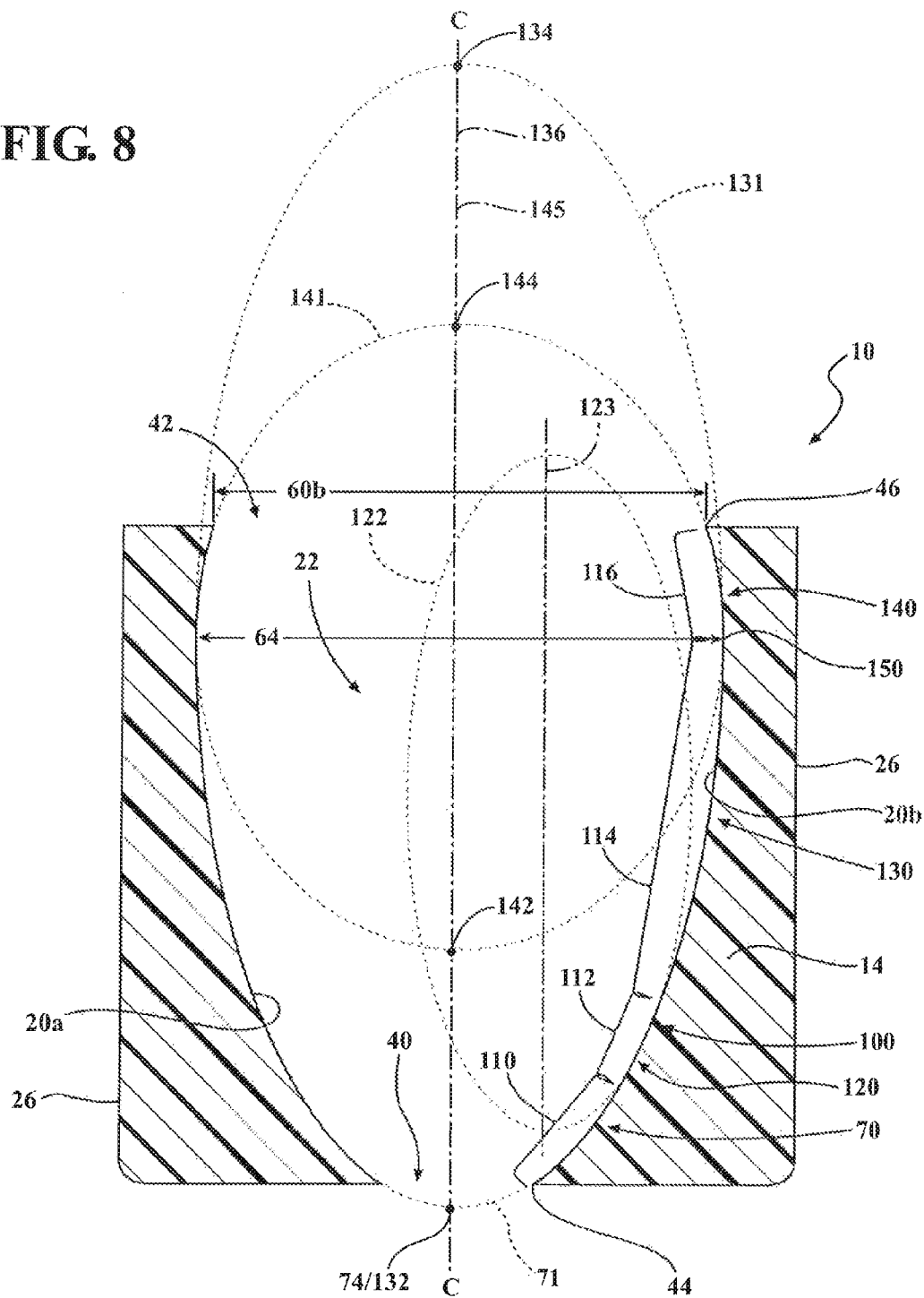
FIG. 8 is a cross-sectional view of the reflector according to yet another embodiment.

As shown in FIG. 8 the inner surface 20 may have a compound conic cross-section along the central axis C. The term "compound conic cross-section" is defined generally as a cross-section that has a combination of conic cross-sections including, but not limited to, parabolic, elliptical, and/or blended cross-sections, as described above.

According to one embodiment, as shown in FIG. 8, the inner surface 20 has the compound conic cross-section. In some instances, only one of the opposing sides 20a, 20b of the inner surface 20 may have the compound conic cross-section. Alternatively, both opposing sides 20a, 20b of the inner surface 20 may have the compound conic cross-section. Although both opposing sides 20a, 20b of the inner surface 20 may have the compound conic cross-section, only one side 20b of the inner surface 20 is described below for simplicity in description. Thus, features of the compound conic cross-section described below in regards to one of the opposing sides 20a, 20b of the inner surface 20 may apply fully and equally to the other one of the opposing sides 20a, 20b of the inner surface 20.

In FIG. 8, the inner surface 20 has a first surface 110, a second surface 112, a third surface 114, and a fourth surface 116. These surfaces 110, 112, 114, 116, define the side 20b of the inner surface 20 in cross-section.

The first surface 110 has the parabolic configuration 70. In other words, a cross-section of the first surface 110 is parabolic. The parabolic configuration has the parabola 71 with the vertex 74 of the parabola 71 located beyond the first end 44. The first aperture 40 is defined at least partially by the first surface 110.

The second surface 112 is connected to the first surface 110. The second surface 112 has the blended parabolic and elliptical configuration 100. In other words, the second surface 112 has a cross-section that is at least partially parabolic and at least partially elliptical. In FIG. 8, the second surface 112 is defined partially by the parabola 71 that defines the first surface 110 and partially by a first ellipse 122. A major axis 123 of the first ellipse 122 is off center from the central axis C.

The third surface 114 is connected to the second surface 112. The third surface 114 has a second elliptical configuration 130. In other words, a cross-section of the third surface 114 is elliptical. The second elliptical configuration 13 is different than the first elliptical configuration 120. The second elliptical configuration 130 has second ellipse 131 that is different than the first ellipse 122. The second ellipse 131 has a first vertex 132 located beyond the first end 44 of the unitary silicone body 14 and an opposing second vertex 134 located beyond the second end 46 of the unitary silicone body 14. A major axis 136 of the second ellipse 131 aligns with the central axis C. In one embodiment, the third surface 114 is defined by the parabola 71 that defines the first surface 110. In such instances, the vertex 74 of the parabola 71 and the first vertex 132 of the second ellipse 131 may be located at the same point.

The fourth surface 116 is connected to the third surface 114. The fourth surface 116 has a third elliptical configuration 140. In other words, a cross-section of the third surface 114 is elliptical. The third elliptical configuration 140 is different than the first and second elliptical configurations 120, 130. The third elliptical configuration 140 has a third ellipse 141 that is different than the first and second ellipses 122, 131. The third ellipse 141 that has a first vertex 142 located between the first and second ends 44, 46 and an opposing second vertex 144 located beyond the second end 46. A major axis 145 of the third ellipse 141 is aligned with the central axis C. The second aperture 42 is defined at least partially by the fourth surface 116.

In FIG. 8, the maximum inner diameter 64 of the inner surface 20 is defined in a plane that is perpendicular to the central axis C and located proximate to an interface 150 defined between the third and fourth surfaces 114, 116. In some instances, the interface 150 may be located at a point that is geometrically tangential in nature due to convergence of the respective curves of the second and third ellipses 131, 141. As such, the maximum inner diameter 64 may be located substantially proximate to the interface 150. In other words, the maximum inner diameter 64 may not be located exactly at the geometrical tangent defined at the interface 150. In FIG. 8, the inner diameter 60b of the inner surface 20 at the second aperture 42 is less than the maximum inner diameter 64.

The compound conic cross-section may have various other configurations without departing from the scope of the invention. The compound conic cross-section may have any suitable number of surfaces of the inner surface 20. For instance, the compound conic cross-section may have at least two surfaces of the inner surface 20. Additionally, the compound conic cross-section may have any suitable conic configuration for any given surface. For example, any one of the first, second, third, or fourth surfaces 110, 112, 114, 116 in FIG. 8 may have the parabolic configuration 70, the elliptical configuration 80, the blended configuration 100, or any combination thereof.

Figure 9:
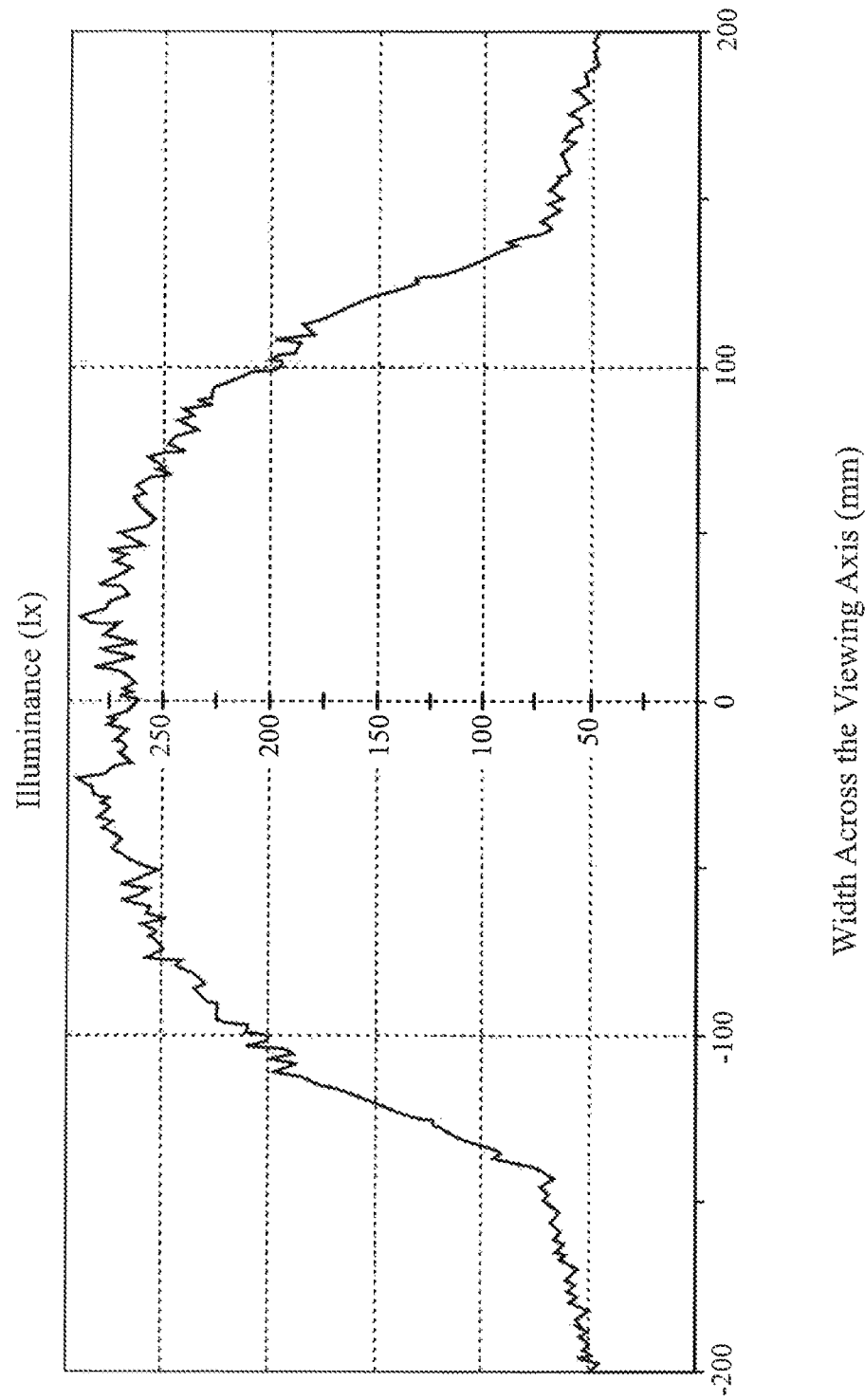
FIG. 9 is graph illustrating power distribution characteristics of an illuminated area generated by the reflector, according to one embodiment.

The illuminated area generated by the reflector 10 exhibits excellent power distribution characteristics. FIG. 9 illustrates the power distribution characteristics of the illuminated area generated by the reflector 10. The horizontal axis of FIG. 9 represents a width of the illuminated area across the viewing axis, measured in millimeters. In one example, the width is a diameter of the illuminated area. The vertical axis of FIG. 9 represents the illuminance (luminous power per unit area) of the illuminated area, measured in lux. As shown in FIG. 9, the illuminated area advantageously exhibits consistent distribution of optical power in a range between −100 and 100 mm across the viewing axis. Within this range, the illuminated area has a maximum illuminance of approximately 295 K and a minimum illuminance of approximately 190 K. As such, the illuminated area exhibits a uniformity over the viewing axis of 0.65, which is calculated by dividing the minimum illuminance by the maximum illuminance. Therefore, the reflector 10 advantageously provides consistent brightness in the illuminated area. As a comparison, a conventional TIR reflector under similar tests exhibits a uniformity over the viewing axis of 0.36, which is nearly half of the uniformity exhibited by the reflector 10.

Figure 10:
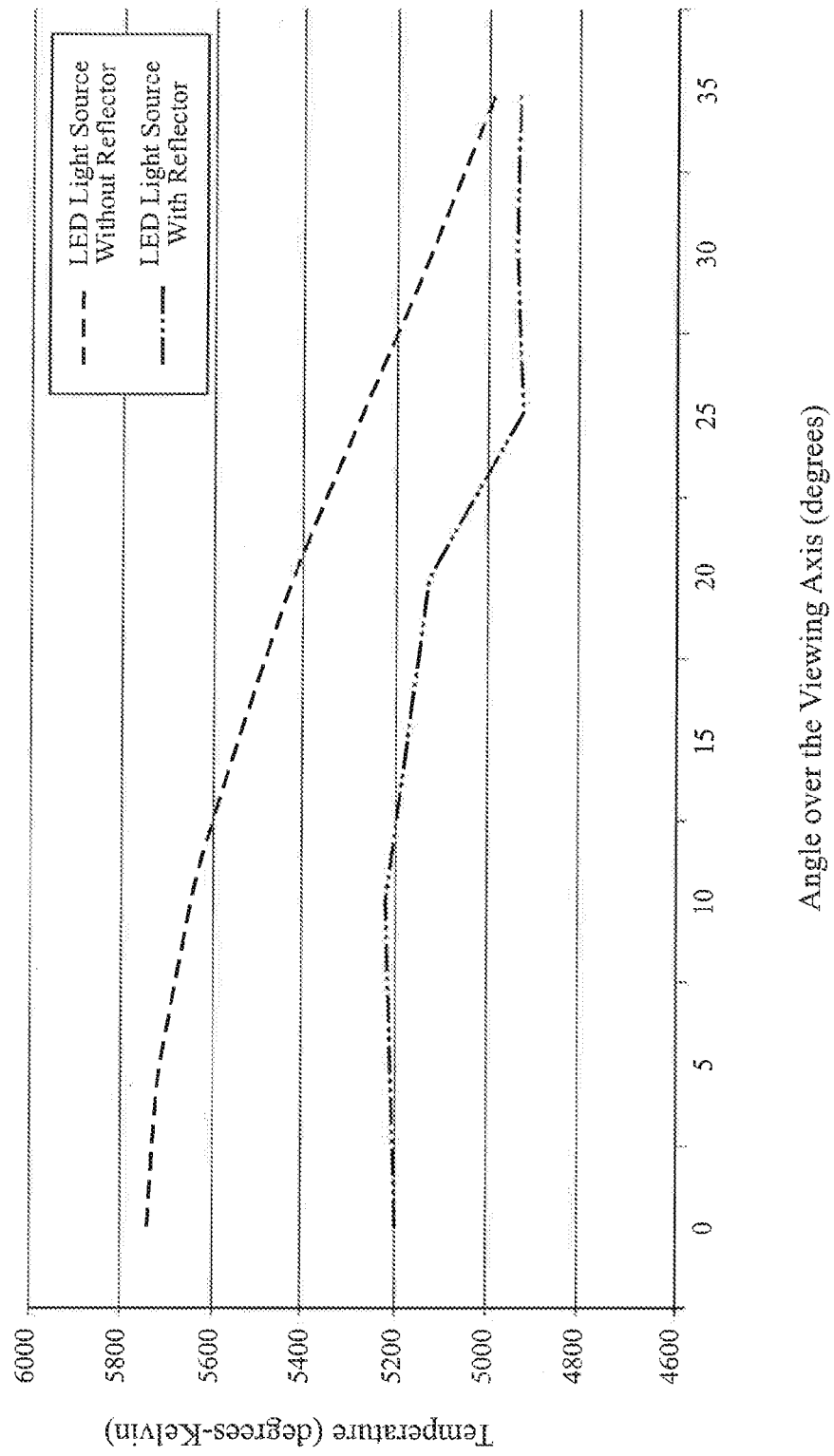
FIG. 10 is graph illustrating color uniformity characteristics of an illuminated area generated by the reflector, according to one embodiment.

The illuminated area generated by the reflector 10 further exhibits excellent color uniformity characteristics. FIG. 10 is graph illustrating color uniformity characteristics of the illuminated area generated by the reflector 10. As shown, the LED light source 12 alone, i.e., without the reflector 10, exhibits an illuminated area having a gradual change in color temperature as the angle over the viewing axis increases. Specifically, in FIG. 10, the illuminated area generated by the LED light source 12 without the reflector 10 has a color change over the viewing angle of 754 K. However, when the LED light source 12 is utilized with the reflector 10, the illuminated area exhibits spectral continuity such that minimal color separation over the viewing axis exists. As shown, the illuminated area generated by the LED light source 12 with the reflector 10 has a color change over the viewing angle of only 296 K. Therefore, the reflector 10 advantageously minimizes color temperature variations in the illuminated area.

Many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A reflector for reflecting light emitted by an LED light source, said reflector comprising a unitary silicone body having a first end and a second end opposite said first end with an inner surface extending between said first and second ends, said inner surface defining:
    a first aperture at said first end for receiving the LED light source; and
    a second aperture at said second end for permitting light emitted from the LED light source to escape said unitary silicone body;
    wherein said inner surface has a maximum inner diameter between said first and second ends and an inner diameter at said second end that is less than said maximum inner diameter;
    wherein said inner surface has a first surface having a cross-section that is parabolic; and
    wherein said inner surface has a second surface connected to said first surface having a cross-section that is at least partially parabolic and at least partially elliptical.

2. The reflector of claim 1 wherein said unitary silicone body is formed from a curable silicone composition.

3. The reflector of claim 2 wherein said curable silicone composition is further defined as a hydrosilylation-curable silicone composition.

4. The reflector of claim 3 wherein said hydrosilylation-curable silicone composition comprises (A) a silicone resin, (B) an organosilicon compound, (C) a hydrosilylation catalyst, and (D) a flame retardant component comprising aluminum hydroxide.

5. The reflector of claim 4 wherein said hydrosilylation-curable silicone composition further comprises (E) a reflective component different from component (D) and comprising titanium dioxide.

6. The reflector of claim 1 wherein said first aperture is defined at least partially by said first surface.

7. The reflector of claim 1 wherein said inner surface has a third surface connected to said second surface and having a cross-section that is elliptical.

8. The reflector of claim 7 wherein said inner surface has a fourth surface connected to said third surface and having a cross-section that is elliptical, said cross-section of said third surface being different than said cross-section of said fourth surface.

9. The reflector of claim 8 wherein said maximum inner diameter of said inner surface is defined substantially proximate to an interface defined between said third and fourth surfaces.

10. The reflector of claim 1 wherein said inner diameter of said inner surface at said second end is greater than an inner diameter of said inner surface at said first end.

11. The reflector of claim 1 wherein said inner surface has a minimum inner diameter defined at said first end.

12. The reflector of claim 1 wherein said inner surface is annularly defined about a central axis.

13. The reflector of claim 1 wherein said unitary silicone body has an outer surface and a retaining feature integrally extending from said outer surface.

14. The reflector of claim 1 wherein said inner surface is at least one of the following: diffuse, matte, white, smooth, and opaque.

15. A method of forming the reflector of claim 1, said method comprising:
    disposing a curable silicone composition into a mold; and
    curing the curable silicone composition in the mold to form the reflector comprising the unitary silicone body.

16. The method of claim 15 wherein disposing the curable silicone composition into the mold includes at least one of injection molding, transfer molding, casting, extruding, overmolding, compression molding, and cavity molding the curable silicone composition into the mold, and wherein curing the curable silicone composition includes applying heat to cure the curable silicone composition.

17. A lighting apparatus comprising an LED light source and the reflector of claim 1, wherein the LED light source is disposed in the reflector in such a way that the lighting apparatus is configured to reflect light emitted by the LED light source.

18. A reflector for reflecting light emitted by an LED light source, said reflector comprising a unitary silicone body having a first end and a second end opposite said first end with an inner surface extending between said first and second ends, said inner surface defining:
- a first aperture at said first end for receiving the LED light source; and
- a second aperture at said second end for permitting light emitted from the LED light source to escape said unitary silicone body;
- wherein said inner surface has a maximum inner diameter between said first and second ends and an inner diameter at said second end that is less than said maximum inner diameter; and
- wherein said inner surface is annularly defined about a central axis.

19. The reflector of claim 18 wherein said inner surface has a cross-section that is at least partially parabolic or at least partially elliptical.

20. A reflector for reflecting light emitted by an LED light source, said reflector comprising a unitary silicone body having a first end and a second end opposite said first end with an inner surface extending between said first and second ends, said inner surface defining:
- a first aperture at said first end for receiving the LED light source; and
- a second aperture at said second end for permitting light emitted from the LED light source to escape said unitary silicone body;
- wherein said inner surface has a maximum inner diameter between said first and second ends and an inner diameter at said second end that is less than said maximum inner diameter; and
- wherein said unitary silicone body has an outer surface and a retaining feature integrally extending from said outer surface.

21. The reflector of claim 20 wherein said inner surface has a cross-section that is at least partially parabolic or at least partially elliptical.

* * * * *